June 5, 1923.

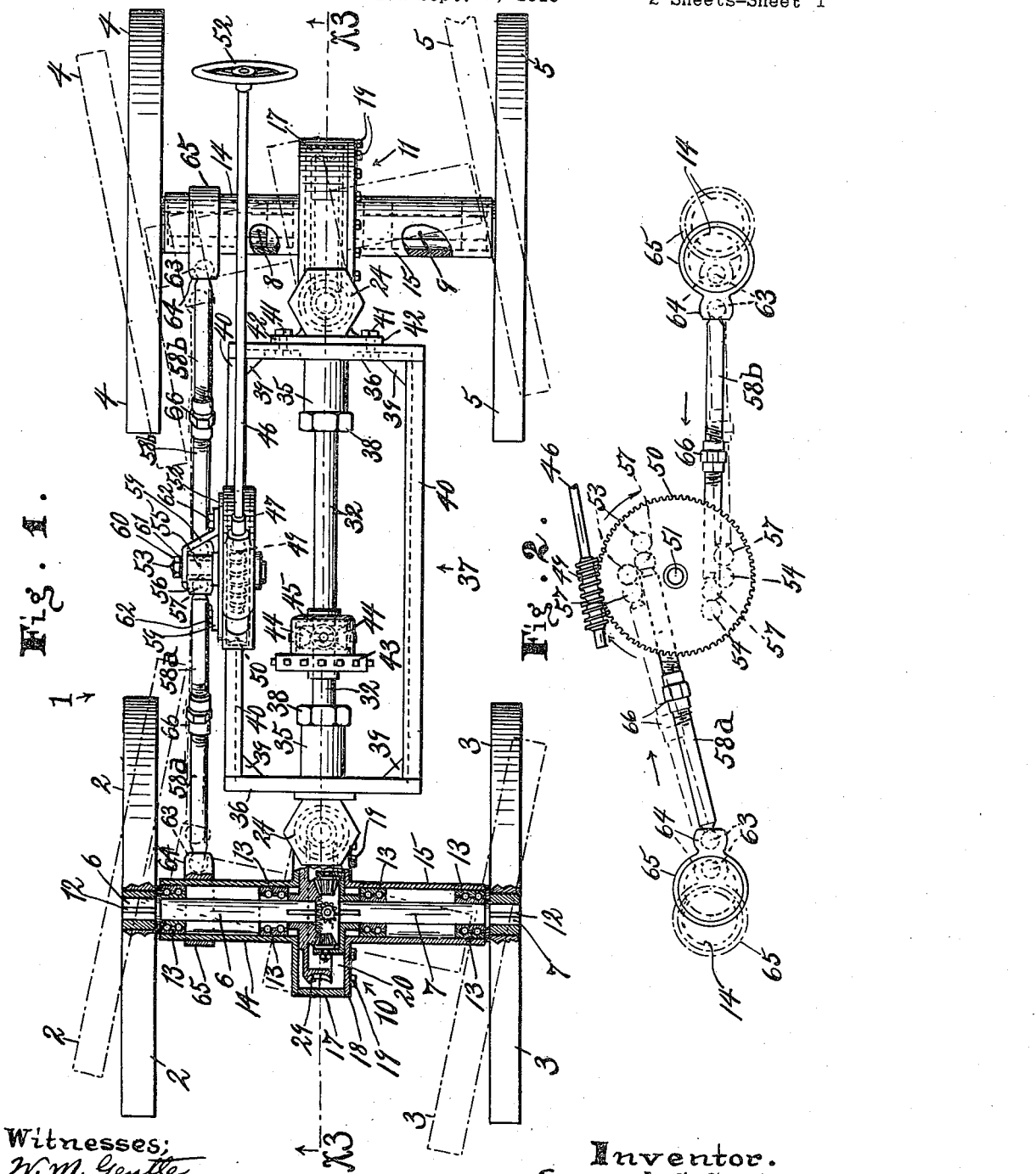

S. C. CARTER

TRACTOR

Filed Sept. 8, 1919

Witnesses;
W. M. Gentle,
C. C. Holly.

Inventor
Samuel C Carter.
James R. Townsend
his atty

Patented June 5, 1923.

1,457,692

UNITED STATES PATENT OFFICE.

SAMUEL C. CARTER, OF LOS ANGELES, CALIFORNIA.

TRACTOR.

Application filed September 8, 1919. Serial No. 322,583.

*To all whom it may concern:*

Be it known that I, SAMUEL C. CARTER, a citizen of the United States, residing at Los Angeles, in the county of Los Angeles and State of California, have invented a new and useful Tractor, of which the following is a specification.

This invention relates to tractors in which the propelling power is equally distributed to the tread base; and also in which there is incorporated special mobility of parts; and the invention may be said to consist in the provision of the new and useful features, construction, combination and arrangement of parts the purposes of which will be apparent to those skilled in the art from a consideration of the preferred form a construction herein shown, described and claimed.

The principal object of this invention is to provide a tractor in which the propelling power is equally distributed to all the tread wheels; that is the tractor is provided with a driving shaft from which power is transmitted to the axles of each tread wheel.

Another object of the invention is to provide a tractor with front and rear wheels that can oscillate relative to one another and in a horizontal plane without effecting their driving connection; that is either the front or rear wheels can have a rocking motion relative to a line central through the driving shaft without effecting the driving connection between the shaft and wheels.

Another feature of the invention is shown in the construction and operation of the steering mechanism by which means exceptionally short turns can be made by the tractor.

Another feature of the invention is shown in the construction, arrangement and operation of the housing and associated parts that enclose the axles, differentials and the ends of the driving shaft.

Other objects and advantages of the invention may appear from the accompanying drawings, the subjoined detailed description and the appended claims.

The accompanying drawings illustrate the invention.

Figure 1 is a plan view of the tractor embodying the invention, the parts associated with the front axle shown in sectional elevation; and the engine and associated parts that are not essential to the invention being omitted.

Fig. 2 is a diagrammatic view of the steering rod connections between the axle housings and the worm wheel, the housings and worm wheel indicated by dotted lines, which dotted position of parts corresponds to the full line position of parts in Fig. 1; and a changed position of the parts shown in full line.

Fig. 3 is a section on the line $x^3$ of Fig. 1; parts shown in side elevation.

Fig. 4 is an enlarged sectional elevation on the line $x^4$ of Fig. 3.

Fig. 5 is an enlarged sectional elevation on the line $x^5$ of Fig. 3.

The tractor 1 has the front and rear wheels 2, 3 and 4, 5 that are secured to their respective axles 6, 7 and 8, 9; which axles are positioned in pairs that abut end to end, and which abutting ends are connected by the differential gears 10 and 11.

The construction and assembly of the front and rear axles are substantially alike except that in position the parts are reversed so that a detailed description of the front axles, which is shown in section in Fig. 1 will describe both. As seen in the foregoing figure the wheels 2, 3 are secured by the keys 12 to the outer ends of the axles 6, 7; and these axles are floated in the ball bearings 13 that are secured in the axle housing 14 and 15. The foregoing construction as applied to both front and rear axles are old and well known and are given only for the purpose of illustration.

The housing 14 has on its inner end the enlarged gear casing 17 in which the differential gear 10 is mounted; and on the inner end of the housing 15 there is a flange 18 that abuts and closes the open side of the gear casing 17, and this flange is secured to the casing by the stud bolts 19; which construction and arrangement of parts forms a dust proof chamber 20 for the differential gear 10.

To one side of the gear casing 17 and integrally connected thereto is the cylindrical sleeve 21 that is pivotally mounted on the upwardly extending cylindrical housing or vertical arm 22 that is integrally connected at its lower end to another gear housing 23.

The cylindrical housing or arm 22 has its upper end threaded to fit the cup screw 24, which screw holds the cylindrical sleeve 21 in place on the arm 22.

The cylindrical arm 22 has an opening 22' therethrough in which opening are secured the roller bearings 25 in which bearings there is mounted the shaft 26 that has integrally connected thereto the worm 27.

The arm 22 has the cutaway portion 28 through which extends the worm gear 29 which gear has its teeth meshing with the teeth of the worm 27. The worm gear 29 is integrally connected with one member of the differential gear 10 and is adapted to rotate the axles 6 and 7 when it is driven by the worm 27.

On the lower end of the shaft 26 and within the gear housing 23 there is secured the bevel gear 30 that meshes with a bevel gear 31 on the driving shaft 32. These gears are enclosed in the chamber 30'; and the bottom of the chamber is closed by the plug nut 31'.

The driving shaft 32 is mounted in the ball bearings 33 that are secured at opposite ends of the cylindrical housing or horizontal arm 34 which housing extends inwardly of the frame toward the opposite axle from the gear casing 23 and at right angles to the vertical arm 22.

The vertical arm 22, the gear casing 23 and the horizontal arm 34, being integral, form an L-shaped hollow post.

The bearing 34 is pivotally mounted in the housing sleeve 35 that is integrally connected to the cross plate 36 of the frame 37. The outer end of the housing 34 is threaded to fit the nut 38 by which means the housing is secured in the bearing sleeve 35.

The frame 37 can be of any described construction. As herein shown the end pieces 36 are secured by the clips 39 to the side plates or channel irons 40, the entirety being below the level of and interposed between the axle housings.

The rear end plate 36 is secured by bolts 41 to the flanges 42 which flanges are integrally connected to the cylindrical housing 34 by which connection the frame 37 and gear housing 23 are secured together so that the frame and rear wheels have similar side motion.

On this frame can be mounted the engine and associated parts not shown. The engine can be of any desired type and connected to the driving shaft 32 by means of a sprocket chain and wheel not shown that are adapted to rotate the sprocket wheel 43 that is secured to the shaft 32.

The shaft 32 is divided at the sprocket wheel 43 and connected by the differential gears 44 that are enclosed in the housing 45. The construction of this differential is old and well known and consequently it is not shown and described; its purpose is also well understood.

From the foregoing it can readily be seen that when the driving shaft 32 is rotated that it will also through the gear and shaft connection heretofore described drive the tractor wheels; and it can also be readily seen that by the means of the pivotal connection of the various parts that the axle housings and wheels can be oscillated in a horizontal plane, and that the wheels can be moved into various positions without effecting the driving connection between them and the driving shaft. In other words the wheels can be moved in a horizontal plane in the arc of a circle for turning or by the pivotal connection of the front axle housing to the frame they can have a rocking movement in a vertical plane that enables them to travel over uneven land. These movements are shown by dotted lines in Figs. 1 and 4.

The tractor is provided with the steering shaft 46 which has one end mounted in the casing 47, which casing is secured by the rivets 48 to a channel iron 40 of the frame 37.

Integrally connected to the steering shaft 46 is a worm 49 that meshes with a worm gear 50 that is mounted on the stub shaft 51 secured in the casing 47. The other end of the steering shaft or post 46 is provided with the hand wheel 52 by which the worm 49 is rotated to turn the worm gear 50.

One side of the casing 47 is open so that the surface 52 of the worm gear 50 is entirely exposed; and to the exposed side of this gear are attached the stud bolts 53 and 54; which bolts are normally positioned an equal radial distance above and below the center of the shaft 51, so that when the gear 50 is rotated the movement of these bolts will be equal, but in opposite directions the purposes of which will be described later.

On these bolts are pivotally mounted the cylindrical casings 55, which casings have in one side thereof the sockets 56 for the balls 57 which balls are integrally connected to one end of the rods 58$^a$ and 58$^b$.

The bolts 53 and 54 are provided with the braces 59 which braces have one end fitting over the outer ends of the bolts 53 and are secured thereby to the washers and nuts 60 and 61 respectively. The other ends of the braces 59 are secured by the screw bolts 62 to the side of the gear 50, and the purpose of these braces is to prevent the stud bolts 53 and 54 from bending when excessive pressure or pull is applied to them.

The other ends 63 of the rods 58 are rounded to fit the sockets 64 in the bands 65, which bands are shrunk over the housings 14 of the respective shafts 6 and 8, and these bands 65 are preferably near to the wheels 2 and 4.

The rods 58ª and 58ᵇ are provided with the nuts 66 that are threaded right and left, by which means these rods are adjustably jointed so that they can be lengthened or shortened to bring all four wheels of the tractor into exact alignment; and when so adjusted it is preferred that the stud bolts 53 are in vertical alignment with the center of the shaft 51, so that the rotation of the hand wheel 52 will impart the same longitudinal movement to both the rods 58ª and 58ᵇ; and thereby move the front and rear axles the same number of degrees on their pivotal connections to the frame.

The rotation of the hand wheel 52 toward the right will draw the wheels 2 and 4 nearer together and separate the other wheels so that if the tractor is moved in either direction it will travel to the right or define a right hand circle; and if the hand wheel is rotated to the left the opposite result will be accomplished. As seen by dotted lines in Fig. 1, the axles are turned about ten degrees off from the full line position so that if the tractor is moved in either direction it will define a right hand circle or turn to the right.

The principle of the steering mechanism is diagrammatically shown in Fig. 2, the dotted line position of the parts indicating the full line position shown in Fig. 1; and the full line position of the parts shown in Fig. 2 is the dotted line position of the parts shown in Fig. 1; and as seen therein the turning of the worm gear 50 in the direction of the arrows moves the front rod 58ª rearwardly, which turns the front axle on the pivot post 22. The same movement of the worm gear 50 moves the rear rod 58ᵇ forwardly, which turns the rear axle on its pivot.

By means of the ball and socket connection of these rods to the worm gear 50 and the axle housings a very free movement of the parts is accomplished. In other words in addition to the rods and associated parts moving as just described for the purpose of steering the tractor, the ball and socket connections permit the front axle to rock relative to the frame thereby enabling the tractor to travel over uneven roads or ground.

In operation the tractor is assembled as heretofore described; and an engine mounted on the frame and operatively connected to drive the shaft 32 so that it will transmit power through the connections heretofore described to all four wheels of the tractor; and by means of the hand wheel 52 the axle housings can be moved on their pivots to turn the tractor in any desired direction.

I claim.

1. In a tractor, front and rear axle housings, a frame interposed between said housings, and L-shaped posts connecting said housings and said frame, the vertical arms of said posts being pivotally connected to said axle housings.

2. In a tractor, front and rear axle housings, a frame interposed between said housings, and L-shaped posts pivotally connecting said housings and said frame, the vertical arms of said posts being pivotally connected to said axle housings and the horizontal arms of said posts being inserted in the ends of said frame.

3. In a tractor, front and rear axle housings, a frame interposed between said housings, and L-shaped posts connecting said housings and said frame; and the horizontal arms of said posts being inserted into the ends of said frame.

4. In a tractor, front and rear axle housings, a frame interposed between said housings, and L-shaped posts connecting said housings and said frame; and the horizontal arms of said posts being inserted into the ends of said frame one of which is pivotally connected thereto and the other of which is secured thereto.

5. In a tractor having front and rear axle housings, axles in said housings, a frame having L-shaped posts attached to the ends thereof, sleeves pivotally connecting the axle housings to the posts on said frame, a driving shaft in said frame, and a driving connection between said driving shaft and said axles.

6. In a tractor having front and rear axle housings, axles in said housings, a frame interposed between said axle housings, said frame having L-shaped posts attached to its ends, sleeves pivotally connecting the axle housings to the posts on said frame, a driving shaft in said frame, and a driving connection from said driving shaft through said posts to said axles.

7. In a tractor having front and rear axle housings, axles in said housings, a frame interposed between said axle housings, said frame having L-shaped posts attached to its ends, sleeves pivotally connecting the axle housings to the posts on said frame, a driving shaft in said frame, a driving connection from said driving shaft through said posts to said axles, and a steering apparatus for moving said axle housings.

8. In a tractor having front and rear axle housings, pairs of axles in said housings, said pairs of axles having their inner ends connected by differential gears, a frame interposed between said axle housings, L-shaped posts attached to the ends of said frame, sleeves pivotally connecting the axle housings to said posts, a driving shaft in said frame, and a driving connection between said driving shaft and the differential gears whereby said axles are rotated.

9. In a tractor having front and rear axle housings, pairs of axles in said housings, said pairs of axles having their inner ends connected by differential gears, a frame interposed between said axle housings, L-shaped posts connected to the ends of said frame, sleeves pivotally connecting the axle housings to said posts, a differential driving shaft in said frame, a driving connection between said differential driving shaft and the differential gears whereby said axles are rotated.

10. In a tractor having front and rear axle housings, pairs of axles in said axle housings, said pairs of axles having their inner ends connected by differential gears, a frame, L-shaped posts connected to the ends of said frame, sleeves pivotally connecting the axle housings to said posts, a driving shaft in said frame, a shaft and gear connection between said driving shaft and the differential gears whereby said axles are rotated, and a steering appliance connecting the front axle housing with the rear axle housing for the purpose specified.

11. In a tractor having a front and rear axle housing, pairs of axles in said axle housings, said pairs of axles having their inner ends connected by differential gears, worm gears connected to the differential gears, a frame, L-shaped posts on the ends of said frame, sleeves pivotally connecting the axle housings to said posts, worm shafts in said posts that are connected with said worm gears, a driving shaft connected with said worm shafts, and a differential gear interposed in said driving shaft.

12. In a tractor having a front axle housing, wheel supporting axles in said housing, a frame, a post pivotally mounted at the front end of said frame, a sleeve pivotally connecting the front axle housing to said post and in advance thereof, rear wheels supporting said frame, a shaft, and a driving connection between said shaft and said axles.

13. In a tractor having a front axle housing, wheel supporting axles in said housing, a frame, a post pivotally mounted at the front of said frame, a sleeve pivotally connecting the front axle housing to said post and in advance thereof, a post secured to the rear of said frame, a rear axle housing, wheel supporting axles in the rear axle housing, a sleeve pivotally connecting the rear axle housing to the post on the rear of said frame and in the rear of said post, and a steering appliance connecting the front and rear axle housing for the purpose specified.

14. In a tractor having a front axle housing, wheel supporting axles in said housing, a frame, a post pivotally mounted at the front of said frame, a sleeve pivotally connecting the front axle housing to said pivotally mounted post and in advance thereof, a post rigidly secured to the rear end of said frame, a rear axle housing, wheel supporting axles in said rear axle housing, a sleeve pivotally connecting the rear axle housing with said rigidly secured post and in rear thereof, a differential driving shaft in said frame, a driving connection between said differential driving shaft and said axles whereby the axles are rotated, and a steering appliance connecting the front and rear axle housings for the purpose specified.

15. In a tractor, front and rear axle housings, a frame interposed between said housings, hollow L-shaped posts connecting said housings and said frame; the horizontal arm of the front L-post being pivotally connected to said frame and the horizontal arm of the rear L-post being secured to said frame.

16. In a tractor, front and rear axle housings, a frame interposed between said axle housings, L-shaped hollow posts connected to the ends of said frame, and pivotal connections between said L-shaped posts and said axle housings.

17. In a tractor, front and rear axle housings, a frame interposed between said housings, L-shaped posts connected to said frame, pivotal connections between said posts and said axle housings, and means for moving said axle housings on said pivotal connections.

18. In a tractor, front and rear axle housings, axles in said housings, wheels on the outer ends of said axles, a frame interposed between said housings and below the level of said axles, and pivotal connections between said housings and said frame, adapted to permit oscillation of said axle housings in a horizontal plane.

19. In a tractor, front and rear axle housings, axles in said housings, wheels on the outer ends of said axles, a frame interposed between said housings and below the level of said axles, pivotal connections between said housings and said frame and said pivotal connections being above the level of said frame and adapted to permit oscillation of said axle housings and wheels in a horizontal plane.

20. In a tractor, front and rear axle housings, a frame interposed between said axle housings, pivotal connections between said axle housings and said frame, said frame being entirely below the level of the axle housings, and means on said frame for moving said axle housings on said pivotal connections and in a horizontal plane.

21. In a tractor, axle housings, a frame, posts pivotally connecting said housings and said frame, said posts having vertical and horizontal arms, the vertical arms of said posts being open from end to end and having an opening on its side opposite the horizontal arms, said horizontal arms being integral with said vertical arms and having an opening from its outer end to the opening of said vertical arm, and means to close said openings so as to prevent dust from entering therein.

22. In a tractor, front and rear axle housings, a frame, front and rear posts connected to said frame, said posts having vertical and horizontal arms, sleeves integral with said housings and pivotally connected to said vertical arms and the ends of said frame being pivotally connected to the horizontal arm of said front post and secured to the horizontal arm of said rear post.

In testimony whereof, I have hereunto set my hand at Los Angeles, California, this 7th day of August, 1919.

SAMUEL C. CARTER.

Witnesses:
JAMES R. TOWNSEND,
WM. M. GENTLE.